Nov. 16, 1943.   B. G. CARLSON   2,334,249
GYRO WHEEL
Filed April 29, 1942

INVENTOR.
BERT G. CARLSON.
BY
ATTORNEY.

Patented Nov. 16, 1943

2,334,249

UNITED STATES PATENT OFFICE 2,334,249

GYRO WHEEL

Bert G. Carlson, Erieside, Ohio, assignor to Jack & Heintz, Inc., Bedford, Ohio, a corporation of Ohio Application April 29, 1942, Serial No. 441,025

1 Claim. (Cl. 253—50)

This invention relates to improvements in gyros and has for its object to provide a gyro that will be light in weight but so constructed with the maximum of its weight at its periphery as to have the maximum efficiency as a spinning gyro with the minimum force necessary to keep it spinning.

With the foregoing and other objects in view, the invention resides in the combination of parts and the details of construction hereinafter set forth in the following specification and appended claim, certain embodiments thereof being illustrated in the accompanying drawing in which:

Figure 1:
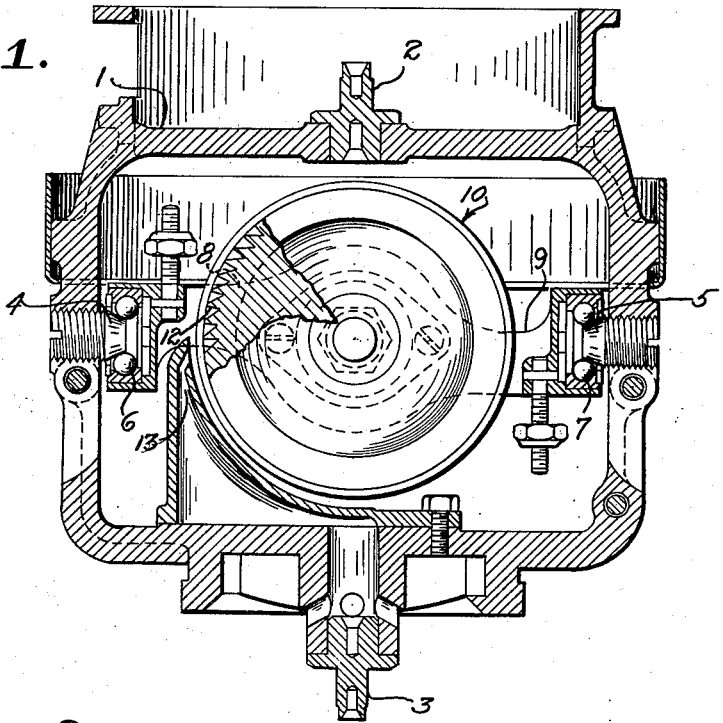
Figure 1 is a top plan view of the gyro casing partly broken away to show part of the gyro and showing the gimbal and outer ring assembly in transverse section.
Figure 2:
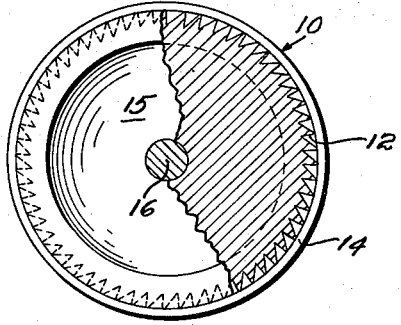
Figure 2 is a view in elevation of the periphery of the gyro wheel.
Figure 3:
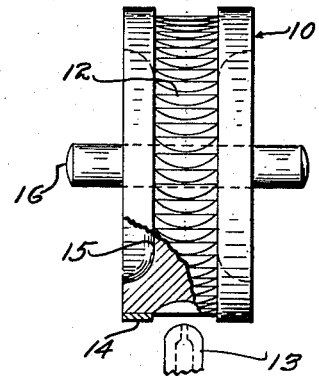
Figure 3 is a view in side elevation of the gyro wheel.

Referring more particularly to the drawing, for illustrative purposes an horizon gyro assembly is shown including outer ring 1 with its trunnions 2 and 3. This ring 1 is provided with adjustable trunnions 4 and 5 to be received in bearings 6 and 7 of the inner ring 8, 9. The gyro wheel is generally indicated at 10 and a portion is shown partly broken away to show the gyro wheel buckets 12 adjacent the air nozzle 13 for impelling the gyro wheel to rotation about its vertical axis.

In gyroscopic instruments and automatic pilots for aircraft it has been found expedient to utilize such light weight material as aluminum and magnesium for the gyro wheel housing in order to obtain overall lightness of the instrument or automatic pilot. It is also preferable to reduce the weight of the gyro wheel as much as possible but without interfering with the proper distribution of weight which makes for efficiency of the gyro in its spinning rotation so as to at all times maintain its proper axis of rotation.

According to the present invention it is proposed to decrease the overall dimensions of the steel gyro wheel 10 and to decrease its thickness from its axis 16 throughout the area 15 with an outward bevel toward the outer rim, in order to reduce the overall weight of the gyro wheel. In order to concentrate the necessary weight for setting up centrifugal forces for maintaining proper speed and axis of rotation a relatively thin band 14 of uniform thickness of metal of high specific gravity is added to the periphery of the wheel on either side of that occupied by the buckets 12. In selecting such a metal of high specific gravity it has been found that tungsten not only is one that is adaptable in application but highly efficient in operation for this intended purpose.

Such a construction is moreover much more satisfactory and efficient than the conventional practice of using gyro wheels of relatively greater bulk and weight without sufficient appreciation of the fact that the concentration of the weight at the gyro wheel periphery is the controlling factor for efficiency.

I claim:

In a gyro apparatus, a gyro wheel having centrally located peripheral buckets and means for discharging fluid into said buckets to spin said gyro about its axis, said wheel having a relatively thin body portion and wide rim portion made of steel and its outer rim portion, on either side of said centrally located peripheral buckets, made of a relatively thin band of tungsten.

BERT G. CARLSON.